March 28, 1933. J. BAJI 1,902,985
REFUSE DISPOSAL TRUCK
Filed March 5, 1931
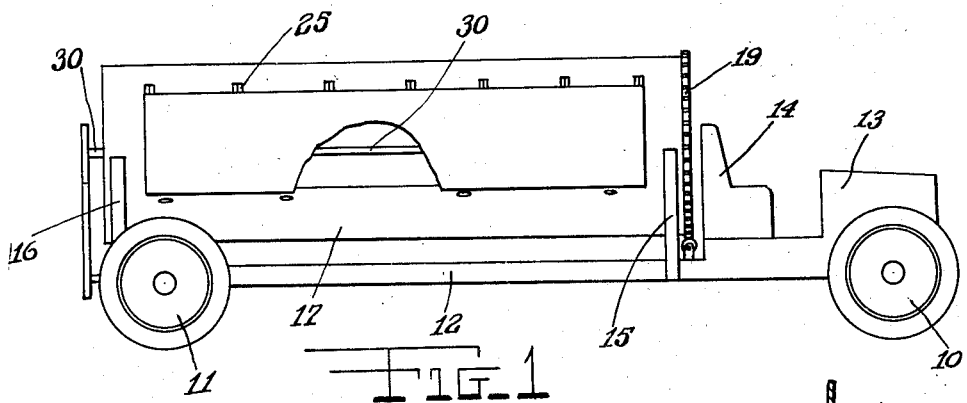
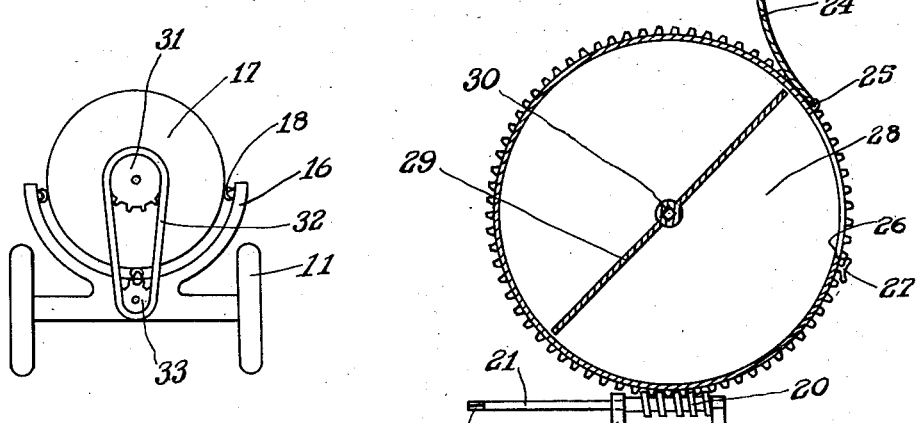
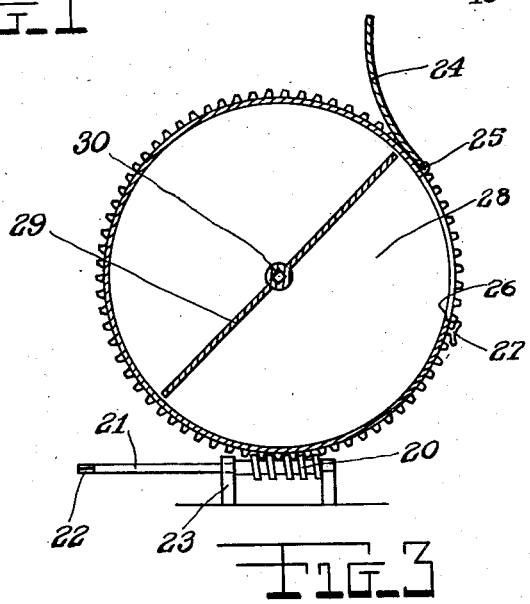
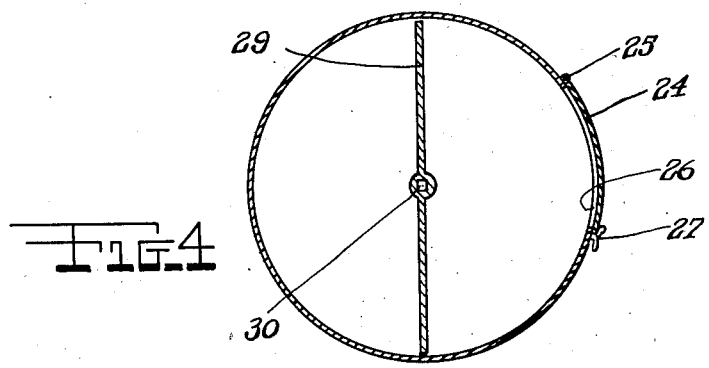
INVENTOR
J. Baji
BY HIS ATTORNEY J. Ledermann Patented Mar. 28, 1933

1,902,985

UNITED STATES PATENT OFFICE

JOHN BAJI, OF NEW YORK, N. Y.

REFUSE DISPOSAL TRUCK

Application filed March 5, 1931. Serial No. 520,185.

The main object of this invention is to provide a truck into which garbage may be conveniently stored and collected preparatory to its removal to a disposal plant or the like.

Another object of the invention is to provide a disposal truck mounted upon wheels which comprises a garbage cylinder having an opening therein and a shovel, the shovel being utilized to shift the garbage and disposal matter when approximately one half of the cylinder is filled with the refuse.

The above and other objects will become apparent in the description below in which characters of reference refer to like named parts in the drawing.

Referring briefly to the drawing, Figure 1 is a side elevational view of the truck with the refuse aperture in open condition.

Figure 2 is a rear end elevational view of Figure 1.

Figure 3 is an enlarged cross-sectional view through the cylinder showing the aperture lid in open position and the means for rotating the drum when unloading the refuse from the cylinder.

Figure 4 is a view similar to Figure 3 showing the lid in closed condition.

Referring in detail to the drawing, the numeral 10 indicates the front wheels of an automotive vehicle. These front wheels together with rear wheels 11 support a chassis 12 at the forward end of which the motor is mounted beneath a cowling 13. The conventional type of operator seat 14 is located to the rear of the cowling 13 on the chassis 12. A pair of substantially semicircular cradles 15 and 16 project upwardly from the chassis and are supported thereon and in turn support a longitudinal cylinder 17. The cradles at spaced apart positions thereon are provided with rollers 18 upon which the cylinder 17 rides when the same is being rotated. The forward edge of the cylinder is provided with a ring gear 19 which meshes with a worm 20. This worm 20 is rotated by a spindle 21 having a square end 22 to which a wrench or similar other tool may be attached. This worm 20 is journaled on lugs 23 mounted upon the chassis of the vehicle. Extending lengthwise on the cylinder is a hinged and curved door 24 which is pivoted on hinge ears 25 and is adapted to cover and close a longitudinal aperture 26 when a latching pawl 27 is rotated to locked position. The cylinder encloses an annular refuse compartment 28 of which one half is capable of being filled with refuse and offal. A diametral shovel or blade 29 is mounted upon a square shaft 30 and is rotatable in the compartment 28 to shift the load of refuse from one half of the compartment to the opposite half. This square shaft is rotatably mounted axially in the front and rear walls of the cylinders. This shaft extends through the rear wall of the cylinder and has a sprocket wheel 31 mounted thereon outside the cylinder which sprocket is engaged by a sprocket chain 32. The sprocket chain engages and meshes with a smaller sprocket wheel 33 which is actuated by the power plant of the vehicle.

The disposal truck herein illustrated is built in the form of rotatable cylinder. This cylinder is rotatable on the cradle members 15 and 16 and is rotated mechanically or manually by the turning of the spindle 21. This spindle rotates the worm 20 and the latter, being in mesh with the ring gear 19 attached to the cylinder, will rotate the cylinder. This is made necessary, for, when the compartment 28 is to be unloaded of its refuse, the aperture 26 must assume a position beneath the cylinder. When the aperture 26 assumes the position shown in Figure 3 the refuse and disposal contained in barrels or cylinders may be lifted so that the contents of these barrels may be projected into the compartment 28 between the shovel 29 and the wall of the cylinder. When this half of the cylinder becomes filled with refuse, the shovel is rotated by means of actuation of the sprocket wheel 31 and chain 32. By rotating this shovel one half of the contents of the compartment 28 is shifted to the opposite side of the cylinder.

It is to be noted that certain changes in form and construction may be made without departing from the spirit and scope of the invention.

It is further to be noted that this type of vehicle permits a one third saving of labor, whereas in the present forms of refuse and disposal vehicles three men are required, one on each side and one to shove the barrel over the top of the vehicle, only two men are needed with this type of vehicle, for the reason that a lift of three feet is all that is necessary to dump an ash can into a disposal cylinder; and since the top of the ash can is about two and one-half feet from the resting surface and the edge of the aperture is only three feet, it will be seen that a six inch lift of the ash barrel will permit the latter to be tilted and directly emptied into the cylinder.

I claim:

1. In a device of the class described, a rotating cylinder, means for rotating said cylinder, said cylinder having an opening therein adapted to receive and discharge refuse, and a blade rotatably mounted inside said cylinder on the axis thereof dividing said cylinder into two equal compartments.

2. In a device of the class described, a rotating cylinder, means for rotating said cylinder, said cylinder having an opening therein adapted to receive and discharge refuse, and means for shifting said refuse to said opening comprising a substantially flat rectangular blade rotatably mounted inside said cylinder on the axis thereof and dividing said cylinder into two equal compartments.

3. In a device of the class described, a rotating cylinder, means for rotating said cylinder, said cylinder having an opening therein adapted to receive and discharge refuse, a shaft rotatable in said cylinder and mounted axially therein, a blade mounted diametrically on said shaft and in said cylinder, said blade member being adapted to shift the refuse from one side of said cylinder to the other when rotated.

4. In a device of the class described, a rotating cylinder, means for rotating said cylinder, said cylinder having an opening therein adapted to receive or discharge refuse, a substantially flat rectangular blade rotatably mounted inside said cylinder on the axis thereof dividing said cylinder into two equal compartments, and means for rotating said blade to shift said refuse from one of said compartments to the other.

In testimony whereof I affix my signature.

JOHN BAJI.